(12) United States Patent
Fuller et al.

(10) Patent No.: US 6,622,536 B1
(45) Date of Patent: Sep. 23, 2003

(54) BALL VALVE LOCKOUT

(75) Inventors: Robert Fuller, West Bend, WI (US); Chris Davis, West Bend, WI (US)

(73) Assignee: Prinzing Enterprises, Inc., Warrenville, IL (US)

( * ) Notice: Subject to any disclaimer, the term of this patent is extended or adjusted under 35 U.S.C. 154(b) by 0 days.

(21) Appl. No.: 10/086,326

(22) Filed: Mar. 1, 2002

(51) Int. Cl.$^7$ ................................................ F16K 35/10
(52) U.S. Cl. ............................ 70/177; 70/178; 70/180; 70/203; 70/212; 137/385
(58) Field of Search ........................... 70/175–180, 202, 70/203, 211, 212; 137/385

(56) References Cited

U.S. PATENT DOCUMENTS

| | | | |
|---|---|---|---|
| 307,101 A | * | 10/1884 | Cole |
| 566,932 A | * | 9/1896 | Patrick |
| 748,720 A | * | 1/1904 | Glazier |
| 812,021 A | * | 2/1906 | Dahl |
| 994,409 A | * | 6/1911 | Kelly |
| 1,484,793 A | * | 2/1924 | Moore |
| 1,643,930 A | * | 6/1927 | Mickler |
| 1,683,649 A | * | 9/1928 | Belote |
| 1,690,461 A | * | 11/1928 | Sieben |
| 1,920,128 A | * | 7/1933 | Mickler |
| 2,706,900 A | * | 4/1955 | Johnson |
| 5,003,797 A | | 4/1991 | Wirth et al. ............... 70/180 |
| 5,143,114 A | | 9/1992 | Daniels ................... 137/385 |
| 5,165,263 A | * | 11/1992 | Perron et al. .............. 70/177 |
| 5,305,622 A | | 4/1994 | Flores ...................... 70/177 |
| 5,427,135 A | | 6/1995 | Kieper ................... 137/385 |
| 5,732,815 A | | 3/1998 | Brouwer ............... 200/43.14 |
| 5,806,555 A | * | 9/1998 | Magno, Jr. .............. 137/385 |

FOREIGN PATENT DOCUMENTS

| | | | | |
|---|---|---|---|---|
| CA | 466917 | * | 8/1950 | ............... 70/178 |
| FR | 646286 | * | 11/1928 | ............... 70/178 |

OTHER PUBLICATIONS

B–Safe "Ball Valve Lockouts," BS01–BS04 (2 pages).

* cited by examiner

Primary Examiner—Lloyd A. Gall
(74) Attorney, Agent, or Firm—McAndrews, Held & Malloy, Ltd.

(57) ABSTRACT

A valve lock for securing the handle of a pipe. The valve lock includes a first housing having first and second contact points for engaging the pipe and a retention chamber that receives the handle. The first housing is in a final position to prevent rotation of the handle when the retention chamber receives the handle and the first and second contact points are seated against the pipe. A second housing has a third contact point for engaging the pipe and a lock member for disposition relative to the first housing when the first housing is in the final position and the third contact point is seated against the pipe. The lock member receives the shackle of a padlock to secure the lock member to the first housing.

19 Claims, 3 Drawing Sheets

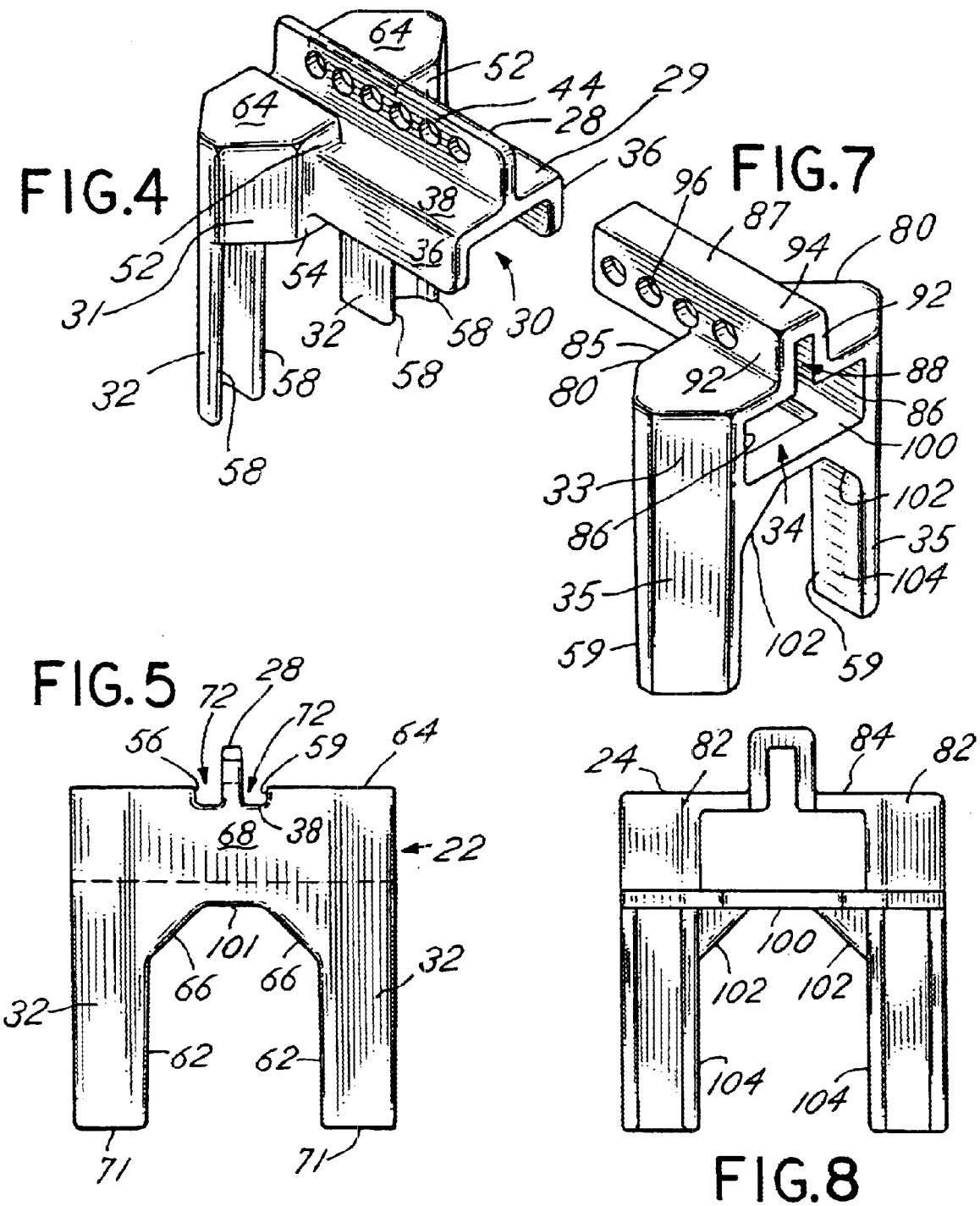

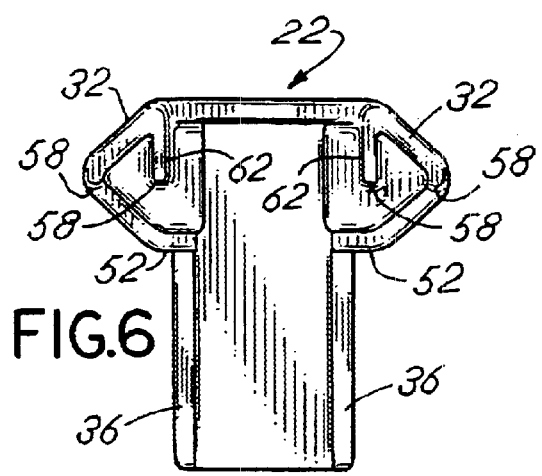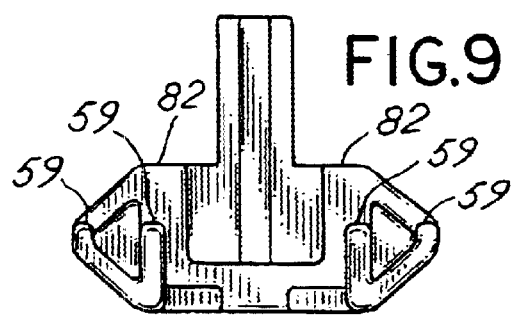

BALL VALVE LOCKOUT

CROSS-REFERENCE TO RELATED APPLICATION

Not applicable

STATEMENT REGARDING FEDERALLY SPONSORED RESEARCH OR DEVELOPMENT

Not applicable.

BACKGROUND OF THE INVENTION

The present invention generally relates to a locking device for securing a rotatable handle. More particularly, the present invention relates to a pipe valve lockout assembly for securing a ball valve handle in a closed or open position relative to the pipe containing the valve.

Pipes that convey liquid or gas generally include valve systems that allow an operator to block or open the passageway through the pipe. A ball valve is situated in the passageway of the pipe and may be adjusted to block the passageway by rotating a valve handle to a position perpendicular to the pipe. Alternatively, the ball valve may be adjusted to open the passageway by rotating the valve handle to a position parallel and alongside the pipe. Often the valve handle needs to be secured in the open or closed position by a valve lockout assembly to ensure the safety of those working on the pipe or on equipment connected to the pipe. For example, the valve lockout assembly prevents accidental opening of the pipe while maintenance is being performed on the pipe.

A valve lockout assembly is described in U.S. Pat. No. 5,003,797 issued to Wirth that includes a housing and securing leg. The housing includes a chamber having an entrance for receiving a valve handle in the closed position so that the valve handle is positioned within the chamber and at an angle to a side wall of the chamber. The housing is then rotated so that the valve handle is flush with the side wall allowing a securing leg of the housing to engages engage the pipe. A padlock shackle is then positioned through a pair of the aligned apertures in the housing to secure the valve handle in the closed position.

However, such a lockout assembly may not be used to secure a valve handle in the open position where the valve handle is parallel to the pipe. In addition, the assembly is susceptible to being loosened because the tension holding the assembly about the valve handle is generated mainly from the resistance of the bearing surface against one side of the pipe wall. The bearing surface engages only a small surface area of the pipe wall, therefore, the securing leg may become disengaged from the pipe wall and leave the valve handle unsecured.

It is therefore an object of the present invention to provide an improved valve lockout device.

It is another object of the present invention to provide for a valve lockout assembly that is compatible with a valve handle in the open position or in the closed position.

SUMMARY OF THE INVENTION

These and other objects of the invention are achieved in a valve lock for locking a pipe valve in either its open or its closed position. A typical pipe valve has a longitudinally extending handle which is rotatable relative to the axis of the pipe containing the valve. The valve occupies a closed position when the handle is at a position orthogonal to the axis of the pipe, and occupies an open position when the handle is at a position parallel to the axis of the pipe. The valve lock includes a pair of mateable housings having contact points for seating against the pipe and a retention chamber shaped for receiving the handle and preventing its movement, The housings have a lock structure which receives the shackle of a padlock for securing the two housings in their mated position about the pipe to restrain movement of the valve handle.

BRIEF DESCRIPTION OF SEVERAL VIEWS OF THE DRAWINGS

FIG. 4 is an isometric view of one of the housings of FIG. 1.

FIG. 5 is a rear view of the housing of FIG. 4.

FIG. 6 is a top view of the housing of FIG. 4.

FIG. 7 is an isometric view of the other housing of FIG. 1.

FIG. 8 is a rear view of the housing of FIG. 7.

FIG. 9 is a bottom view of the housing of FIG. 7.

DETAILED DESCRIPTION OF A PREFERRED EMBODIMENT

Figure 1:
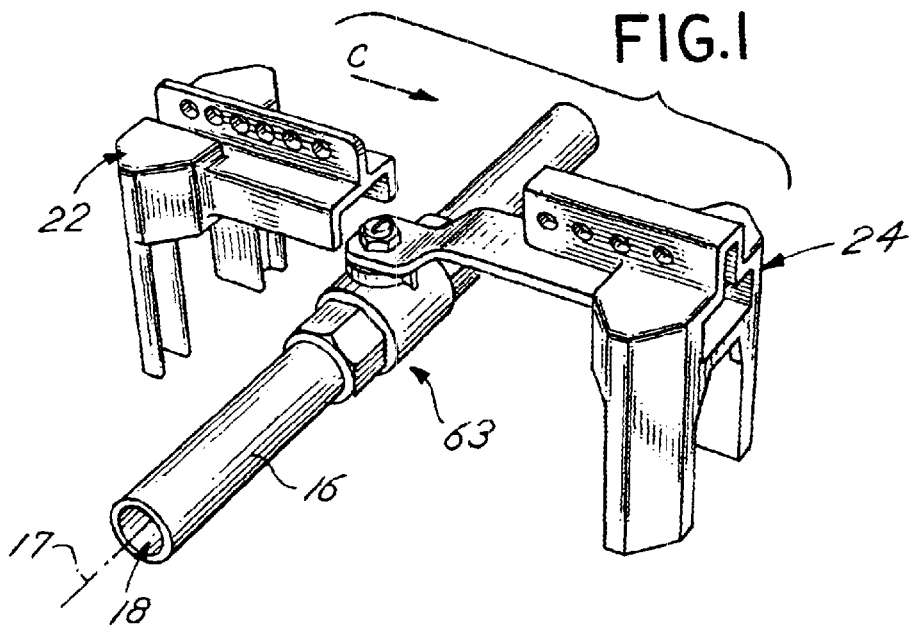
FIG. 1 is an isometric view of an embodiment of a valve lockout assembly of the present invention, showing a pair of housings of the lockout assembly positioned relative to the valve handle.
Figure 2:
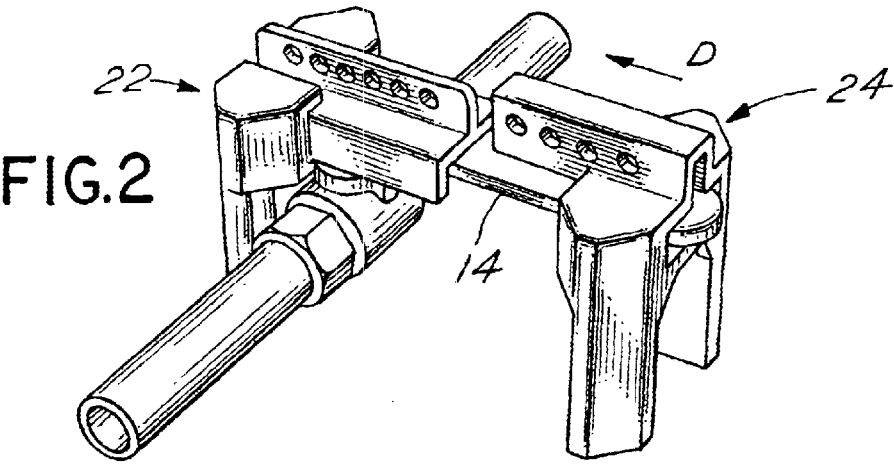
FIG. 2 is an isometric view of the housings of FIG. 1 positioned relative to the valve handle.
Figure 3:
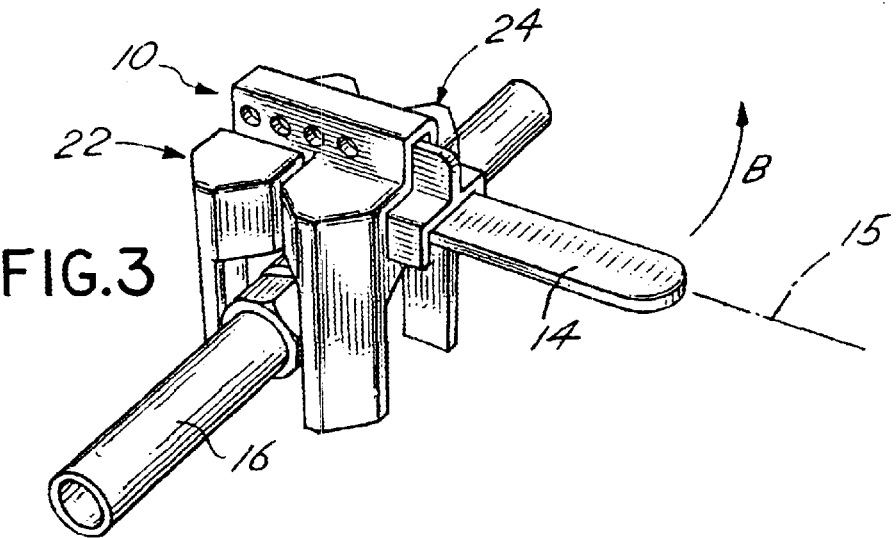
FIG. 3 is an isometric view of the valve lockout assembly of FIG. 1 which is secured to a valve handle.

Referring to FIGS. 1–3, a valve lockout assembly 10 is secured about a valve handle 14 relative to a cylindrical pipe 16. Valve handle 14 is generally planar in shape, and is connected to a valve (not shown) which is disposed within pipe 16. The valve is closed by rotating handle 14 to block a passageway 18 extending through pipe 16. Handle 14 occupies a "closed" position when the longitudinal axis 15 of the handle is disposed orthogonal to the longitudinal axis 17 of the pipe, as shown in FIG. 3. Alternatively, the valve is adjusted to open passageway 18 by rotating valve handle 14 counterclockwise in the direction of arrow B. Handle 14 occupies an "open" position when the longitudinal axis 15 of the handle is disposed parallel to the longitudinal axis 17 of the pipe.

Referring to FIG. 1, lockout assembly 10 is constructed from two separate housings 22, 24, which are manually moved together to mate about handle 14. When handle 14 is in its "closed" position, as shown in FIG. 1, housing 22 is slid in the direction of arrow C to enclose the top of handle 14, as shown in FIG. 2. Next, housing 24 is slid in the direction of arrow D (FIG. 2) mating with housing 22 and enclosing handle 14. Thus, housings 22, 24 are secured about the valve handle, as shown in FIG. 3.

Referring now to FIG. 4, housing 22 includes a base 31 and a laterally extending U-shaped member 29. U-shaped member 29 forms a retention chamber 30 for slidingly receiving handle 14. Housing 22 also includes a pair of V-shaped securing legs 32 which are spaced apart and connected by base 31. Each leg 32 includes a pair of bearing surfaces 58 formed along the substantial length of each leg for making contact against pipe 16. As seen in FIG. 6, the four bearing surfaces 58 are planarly disposed for contact with pipe 16 or, depending upon the particular valve, for making contact with the outer surface of the valve unit 63 (FIG. 1) which houses the valve.

Referring to FIG. 7, housing 24 includes a base 33 having a retention chamber 34 for slidingly receiving both U-shaped member 29 of housing 22 and handle 14. Housing 24 also includes a pair of V-shaped securing legs 35 which are spaced apart and connected by base 33. Each leg 35 includes a pair of bearing surfaces 59 formed along the substantial length of the leg for making contact against pipe 16, or against valve unit 63 (depending on the type and size of valve 63 and the particular spacing between legs 35). As seen in FIG. 9, the four bearing surfaces 59 are planarly disposed for contact with pipe 16 or valve unit 63.

Referring again to FIGS. 4 and 6, base 31 includes two L-shaped front contact walls 52 that extends between a top surface 64 and a bottom surface 54 of base 31. Front contact walls 52 engage and resist housing 24 when the two housings are mated in a final position about the valve handle as shown in FIG. 3.

Retention chamber 30 is defined by a pair of rectangular side wall members 36 disposed perpendicular to, and formed integral with, a top wall member 38. Sidewall members 36 and top wall member 38 extend laterally and perpendicularly from front contact walls 52 of base 31. When housing 22 is positioned on to valve handle 14, top wall member 38 slides along the top surface of valve handle 14, and side wall members 36 slidingly engage and enclose valve handle 14.

As shown in FIG. 4, a lock member 28 extends upwardly and perpendicularly from the top surface of top wall member 38. Lock member 28 is centrally located, and extends the length of top wall member 38. Lock member 28 includes a plurality of apertures 44 which are circular in shape. Alternatively, apertures 44 may be non-circular in shape, as for example, having a half circle or less than a circle of cross-sectional area, referred to herein as gaps. Six separate apertures 44 are shown in FIG. 4, but more or less may be used.

Lock member 28 and U-shaped member 29 are received by and retained in retention chamber 34 of housing 24 (FIG. 7) as housing 24 is positioned about the valve handle 14 in a final position. As shown in FIG. 7, a U-shaped channel member 87 is centrally disposed on base 33. Member 87 includes a chamber 88 of a size to receive lock member 28 of housing 22. Channel member 87 includes a plurality of apertures 96 (four shown) disposed on each side of chamber 88. The four apertures 96 on one side of chamber 88 are aligned with four apertures 96 on the other side of chamber 88. Apertures 96 are circular in shape and are the same size as apertures 44 of lock member 28. More or less than four apertures 96 may be used on each side of chamber 88. A pair of aligned apertures 96 are disposed in alignment with one aperture 44 when the housings are mated in a lock position. When the housings are so mated in the lock position, the shackle of a padlock (not shown) is positioned through the two aligned apertures 96 and one aligned aperture 44 to secure and maintain the housings in a locked position. The apertures 44 are spaced closer to one another than the spacing between apertures 96. This allows for the lockout assembly to be used with various diameters of pipes and valve units.

As shown in FIG. 4, securing legs 32 are formed integral with, and extend downward from, the base 31 of housing 22. When housing 22 is positioned about pipe 16 and the valve handle 14 (FIG. 3), with the valve handle 14 in its closed position orthogonal to pipe 16, the contact surfaces 58 engage, and are resisted by, pipe 16. When housing 24 (FIG. 7) engages and receives housing 22 in the final position, the contact surfaces 59 of the housing 24 engage and are resisted by pipe 16. The valve lockout assembly 10 is thus retained securely around valve handle 14, preventing manual movement of the valve handle.

Referring to FIGS. 5 and 6, securing legs 32 also include a pair of inside walls 62 that are parallel to each other and extend to the distal end 71 of the legs. A pair of support walls 66 extend upwardly from the top of inside walls 62 at an angle to the inside walls, and meet a bottom portion 101. When the lockout assembly is used to secure the base handle in its open position, support walls 66 are positioned on pipe 16 such that inside walls 62 straddle pipe 16. The lockout assembly 10 is thus positioned ninety degrees counterclockwise from its position shown in FIG. 3.

As shown in FIG. 5, the top wall member 38 extends to a rear wall 68. Rounded recesses 72 are formed between lock member 28 and a pair of inner walls 56. Recesses 72 receive and retain locking chamber 87 (FIG. 7) of housing 24 when the housings are mated into the final position.

Referring to FIG. 7, chamber 34 is formed in housing 24 by a pair of side walls 86 extending between a top wall 84 and a U-shaped bottom wall 100. Retention chamber 34 is connected to chamber 88 which is defined by two rectangular side walls 92 that extend up from top wall 84 to a rectangular top wall 94.

Retention chamber 34 receives the valve handle and the U-shaped member 29, and chamber 88 receives the lock member 28 (FIG. 4). The top wall 84 of retention chamber 34 is slid along the top wall 38 of the U-shaped member 29 as the side walls 86 and 36 likewise slidably engage each other. The side walls 92 of the locking channel 87 slide on the top wall 38 and into the recesses 72 (FIG. 5) with the lock member 28 sliding between the side walls 92 in the locking channel 88. The valve handle 14, U-shaped member 29 and lock member 28 extend completely through retention chamber 34 as shown in FIG. 3. When housings 22, 24 are in the final position, as shown in FIG. 3, a single aperture 44 of lock member 28 is aligned with a pair of aligned apertures 96 of channel 87. The valve lockout assembly 10 is maintained in the final position by securing the padlock shackle through aligned apertures 44, 96. The mating of housings 22, 24 occur in the same manner whether the valve handle is locked in open position or the closed position.

As shown in FIG. 8, front contact walls 82 engage and resist the front contact walls 52 (FIG. 4) of housing 22 when the housings 22, 24 are in the final position about the valve handle.

Returning to FIG. 7, the securing legs 35 of the housing 24 are formed integral with, and extend downward from base 33. Securing legs 35 are separated by a predetermined distance in order to engage pipe 16. When the housing 24 is positioned to receive U-shaped member 29 and valve handle 14, the contact surfaces 59 engage and are resisted by the pipe 16. With each securing leg engaging the pipe at a contact point on either side of the valve handle 14, the valve handle 14 is prevented from being rotated.

The securing legs 35 include inside walls 104 that face each other and extend downward from a bottom portion 100 (FIG. 8). Bottom portion 100 is buttressed by, and formed integral with, two support walls 102 that extend upwardly at an angle from the inside walls 104. Support walls 102 and inside walls 104 straddle pipe 16 (FIG. 3) when the valve lockout assembly 10 is used to secure the valve handle 14 in the open position.

Returning to FIG. 3, the padlock prevents the housing from becoming disengaged and thus maintains the securing legs 32, 35 bearing against pipe 16. The valve lockout assembly confers several benefits. First, the valve lockout assembly may be used to secure a valve handle that is either orthogonal or parallel to the pipe. Thus, the ball valve may be secured in either the closed or open position depending on the needs of the user. Secondly, the valve lockout assembly securely holds the valve handle and prevents any rotation of the valve handle because the securing legs of the housings bear against the pipe opposite each other to resist movement of the housings. Finally, the multiple apertures and their spacing on the valve lockout assembly allow the adjustment of the lockout assembly with respect to different diameters of pipes and valve units.

While the invention has been described with reference to certain embodiments, it will be understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. A valve lock adapted to receive a padlock for locking a pipe valve in either one of two valve positions, said pipe valve connected to a pipe, said pipe valve having a longitudinally extending handle rotatable relative to the longitudinal axis of the pipe, the handle being rotatable to occupy a first handle position having its handle axis orthogonal to the axis of the pipe to place the pipe valve in a first valve position and rotatable to occupy a second handle position having its handle axis parallel to the axis of the pipe to place the valve in a second valve position, said valve lock comprising:

a first housing having
      i. a first pair of contact points for seating against said pipe;
      ii. a second pair of contact points for seating against said pipe; and
      iii. a retention structure, said retention structure shaped for contacting said handle to restrain its rotational movement;
   said first housing positionable to a first final position when said handle is in said first handle position, for preventing said handle from being rotated to operate the valve, said first housing being disposed such that (1) said retention structure contacts said handle when movement of said handle is attempted and (2) said first pair of contact points are seated against said pipe when movement of said handle is attempted; and
   said first housing positionable to a second final position when said handle is in said second handle position, for preventing said handle from being rotated to operate the valve, said first housing being disposed such that (1) said retention structure contacts said handle when movement of said handle is attempted and (2) said second pair of contact points are seated against said pipe when movement of said handle is attempted;
   a second housing securable to said first housing (1) preventing removal of said first housing from said first final position and (2) preventing removal of said first housing from said second final position, said second housing having a contact point for seating against said pipe and a lock member, said lock member having a structure for cooperating with the shackle of a padlock for securing said second housing to said first housing.

2. The valve lock of claim 1, wherein said first housing has a plurality of first apertures, and said lock member having a plurality of second apertures, one of said first and one of said second apertures being aligned when said lock member is disposed relative to said first housing occupying either one of said first or said second final positions, said ones of said first and second apertures being of a size for receiving the shackle of the padlock to secure said lock member to said first housing.

3. The valve lock of claim 1, wherein said first housing has a plurality of apertures, and said lock member having a plurality of gaps, said gaps and said apertures being aligned when said lock member is disposed relative to said first housing occupying either one of said first or said second final positions, said apertures and gaps receiving the shackle of the padlock to secure said lock member to said first housing.

4. The valve lock of claim 1, wherein said first and second housings each include at least one securing leg configured to bear against the pipe opposite each other and prevent the handle from being rotated.

5. The valve lock of claim 1, wherein said first housing includes a locking channel extending from said retention structure receiving said lock member and configured to be secured to said lock member by the shackle of the padlock.

6. The valve lock of claim 1, wherein said second housing includes a retention chamber with an open end receiving the handle, said retention structure of said first housing receiving said retention chamber and the handle.

7. The valve lock of claim 1, wherein said first housing includes a locking channel extending from said retention structure, said second housing includes a retention chamber with an open end receiving the handle, said retention structure receiving said retention chamber and the handle and said locking channel receiving said lock member.

8. The valve lock of claim 1, wherein said first pair of contact points are separated by a predetermined distance and seated against the pipe on opposite sides of the handle, said first pair of contact points bearing against the pipe to prevent the handle from being rotated when the handle is received in said first housing in said first final position.

9. The valve lock of claim 2, wherein said lock member has a plurality of apertures for alignment in order to receive the shackle of a padlock for securing said lock member to said first housing.

10. A valve lock for locking a pipe valve connected to a pipe, said pipe valve having a longitudinally extending handle rotatable relative to the longitudinal axis of the pipe, the handle being rotatable to occupy a first handle position orthogonal to the axis of the pipe and to a second handle position parallel to the axis of the pipe, said valve lock comprising:

a first housing having
      i. first and second securing legs for seating against the pipe; and
      ii. a retention chamber, said retention chamber shaped for receiving the handle;
   said first housing occupying either one of a first or a second final position for preventing the handle from being rotated to operate the valve, said first housing occupying said first final position when the handle occupies the first handle position, said first final position defined by said first housing being disposed such that (1) said retention chamber receives the handle, and (2) said first and second securing legs are in a first position seated alongside and against the pipe, said first housing occupying said second final position when the handle occupies the second handle position, said second final position defined by said first housing being disposed such that (1) said retention chamber receives the handle and (2) said first and second securing legs are in a second position oriented orthogonal with respect to said first position;

a second housing having
   i. third and fourth securing legs for seating against the pipe; and
   ii. a lock member for disposition relative to said first housing when (1) said first housing is in one of said first and second final positions and (2) said second housing occupies either one of a third or a fourth final position, said second housing occupying said third final position when the handle occupies the first handle position, said third final position defined by said second housing being disposed such that said third and fourth securing legs are in a third position seated alongside and against the pipe, said second housing occupying said fourth final position when the handle occupies the second handle position, said fourth final position defined by said second housing being disposed such that said third and fourth securing legs are in a fourth position oriented orthogonal with respect to said third position;

and wherein said lock member having a structure for cooperating with the shackle of a padlock for securing said lock member to said first housing.

11. The valve lock of claim 10, wherein said first housing occupies said first final position when said retention chamber receives the handle disposed orthogonal to the axis of the pipe with said first and second securing legs of said first housing bearing against the pipe opposite said third and fourth securing legs of said second housing.

12. The valve lock of claim 10, wherein said first housing occupies said second final position when said retention chamber receives the handle disposed parallel to the axis of the pipe with said first and second securing legs of said first housing straddling the pipe.

13. The valve lock of claim 10, wherein said first and second housings have apertures being aligned when said lock member is disposed relative to said first housing occupying either one of said first or second final positions, said apertures receiving the shackle of the padlock to secure said lock member to said first housing.

14. The valve lock of claim 10, wherein said second housing has gaps and said first housing has apertures, said gaps and said apertures being aligned when said lock member is disposed relative to said first housing occupying either one of said first or second final positions, said apertures and gaps receiving the shackle of the padlock to secure said lock member to said first housing.

15. The valve lock of claim 10, wherein said first housing includes a locking channel extending from said retention chamber receiving said lock member and configured to be secured to said lock member by the shackle of the padlock.

16. The valve lock of claim 10, wherein said second housing includes a second retention chamber with an open end receiving the handle, said first retention chamber of said first housing receiving said second retention chamber and the handle.

17. The valve lock of claim 10, wherein said first housing includes a locking channel extending from said retention chamber, said second housing includes a second retention chamber with an open end receiving the handle, said first retention chamber receiving said second retention chamber and the handle and said locking channel receiving said lock member.

18. The valve lock of claim 10, wherein said first and second securing legs of said first housing are separated by a predetermined distance and seated against the pipe on opposite sides of the handle when the handle is orthogonal to the axis of the pipe, said first and second securing legs bearing against the pipe to prevent the handle from being rotated when the handle is received in said first housing in said first final position.

19. The valve lock of claim 10, wherein said lock member has a plurality of apertures for alignment in order to receive the shackle of a padlock for securing said lock member to said first housing.

* * * * *